United States Patent
Hong et al.

(10) Patent No.: US 12,463,908 B2
(45) Date of Patent: Nov. 4, 2025

(54) TRAFFIC CATEGORIZATION METHOD AND DEVICE

(71) Applicant: POSTECH RESEARCH AND BUSINESS DEVELOPMENT FOUNDATION, Pohang-si (KR)

(72) Inventors: Won Ki Hong, Pohang-si (KR); Jae Hyoung Yoo, Seoul (KR); Ji Bum Hong, Ansan-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 743 days.

(21) Appl. No.: 17/768,837

(22) PCT Filed: Apr. 10, 2020

(86) PCT No.: PCT/KR2020/004905
§ 371 (c)(1),
(2) Date: Apr. 13, 2022

(87) PCT Pub. No.: WO2021/112344
PCT Pub. Date: Jun. 10, 2021

(65) Prior Publication Data
US 2024/0137323 A1   Apr. 25, 2024
US 2024/0236007 A9   Jul. 11, 2024

(30) Foreign Application Priority Data
Dec. 5, 2019   (KR) .................. 10-2019-0160530

(51) Int. Cl.
*H04L 47/2441*   (2022.01)
*G06N 20/20*   (2019.01)
*H04L 41/16*   (2022.01)
*H04L 43/026*   (2022.01)

(52) U.S. Cl.
CPC ......... *H04L 47/2441* (2013.01); *G06N 20/20* (2019.01); *H04L 41/16* (2013.01); *H04L 43/026* (2013.01)

(58) Field of Classification Search
CPC ... H04L 41/16; H04L 43/026; H04L 47/2441; G06N 20/20
See application file for complete search history.

(56) References Cited

U.S. PATENT DOCUMENTS

2018/0103056 A1*   4/2018   Kohout ............... H04L 41/0686
2020/0026196 A1    1/2020   Luo et al.
2020/0213199 A1*   7/2020   Sethi ....................... H04L 41/16

FOREIGN PATENT DOCUMENTS

KR   10-2006-0059493 A   6/2006
KR   10-2010-0125076 A   11/2010
KR   10-2019-0048004 A   5/2019

(Continued)

*Primary Examiner* — Brian P Cox
(74) *Attorney, Agent, or Firm* — Morgan, Lewis & Bockius LLP (57) ABSTRACT

A traffic categorization method and device are disclosed. A traffic categorization method according to one embodiment of the present invention may comprise the steps of: receiving flow data comprising information about a flow; scaling for the flow data; generating input data by removing, on the basis of a correlation, overlapping data from the scaled flow data; and categorizing a network traffic on the basis of the input data.

14 Claims, 5 Drawing Sheets

(56) References Cited

FOREIGN PATENT DOCUMENTS

| | | |
|---|---|---|
| KR | 10-2019-0117724 A | 10/2019 |
| WO | 2015/009209 A1 | 1/2015 |
| WO | WO-2018153866 A1 * | 8/2018 ......... G03F 7/70125 |

* cited by examiner

TRAFFIC CATEGORIZATION METHOD AND DEVICE

CROSS-REFERENCE TO RELATED APPLICATION

The present application is a U.S. National Phase application under 35 U.S.C. § 371 of an International application No. PCT/KR2020/004905 filed on Apr. 10, 2020, which is based on and claims the benefit of convention priority to Korean Patent Application No. 10-2019-0160530, filed on Dec. 5, 2019 with the Korean Intellectual Property Office, the entire contents of which is incorporated herein by reference in its entirety.

TECHNICAL FIELD

The present disclosure relates to a method of and an apparatus for classifying traffic and, more particularly, to a method of and an apparatus for classifying traffic that are capable of using machine learning.

BACKGROUND

Network traffic classification may serve the purpose of distinguishing between various application services and protocols that are used in a network. The network traffic classification may be one of important elements for network management and security.

For example, the network traffic classification is a mechanism for control of Quality of Service (QoS) that may be used to determine processing priorities of different application services in a limited bandwidth.

The methods of classifying network traffic may include a port-based method of classifying traffic, a payload-based method of classifying traffic, and a flow statistics-based method of classifying traffic.

The port-based method of classifying traffic may classify traffic by identifying a standard port number used in an application program. However, because all application services do not use the standard port number, the port-based method of classifying traffic may cause a problem of failure in traffic classification.

The payload-based method of classifying traffic may classify traffic by identifying a signature of an application service included in a payload of an Internet Protocol (IP) packet. However, in the payload-based method of classifying traffic, there may occur a problem in that the more increased encrypted traffic, the more frequently traffic classification fails.

The flow statistics-based method of classifying traffic may classify traffic by analyzing a flow feature of a network flow. However, in the flow statistics-based method of classifying traffic, there may occur a problem in that the network traffic is precisely classified in a case where traffic of a new application service occurs and when traffic congestion is increased.

SUMMARY

An object of the present disclosure, which is conceived to solve the above-mentioned problems, is to provide a method of and an apparatus for classifying traffic that are capable of using an ensemble learning technique.

Another object of the present disclosure, which is conceived to solve the above-mentioned problems, is to provide a method of and an apparatus for classifying traffic that are capable of classifying traffic with a high degree of precision in a congested network environment.

A method of classifying traffic, according to an exemplary embodiment of the present disclosure for achieving the objective, may comprise: a step of receiving flow data including information on flow; a step of performing scaling on the flow data; a step of generating input data by removing redundant data from among the flow data on which the scaling is performed, on the basis of correlation between the flow data; and a step of classifying network traffic on the basis of the input data.

The correlation may be acquired using a principal component analysis technique.

The input data may include a flow feature, and the flow feature may include at least one of information on a point in time at which the flow arrives, information on a starting position of the flow, and information on a destination of the flow.

The step of classifying network traffic may comprise: a step of classifying, by an apparatus for classifying traffic performing machine learning in advance, network traffic.

The machine learning may be performed using an ensemble learning technique.

The machine learning may be performed through: a step of generating input data on the basis of the flow data on which labeling is performed; a step of extracting a learning sample on the basis of the input data; a step of generating learning data on the basis of the extracted learning sample; and a step of performing the machine learning on the basis of the learning data.

The step of extracting a learning sample may comprise: a step of acquiring a slope of each of the input data; a step of aligning the input data on a magnitude of the slope of each of the input data; a step of extracting a portion of the input data from the input data according to a preset ratio; and a step of extracting the learning sample on the basis of the input data on which sampling is performed.

The step of generating learning data may comprise: a step of performing bundling on the learning sample; and a step of generating the learning data by merging the learning samples on which the bundling is performed.

The step of performing the machine learning may comprise: a step of generating a learning model for performing the machine learning; a step of classifying the learning data into a training set, a validation set, and a test set; a step of acquiring a weighting factor of the learning model on the basis of the training set; a step of verifying the learning model on the validation set; and a step of evaluating the learning model verified through the test set.

An apparatus for classifying traffic, according to another exemplary embodiment of the present disclosure for achieving the objective, may comprise: a processor; and a memory in which one or more commands to be executed by the processor are stored, wherein one or more commands are executed in such a manner as to receive flow data including information on flow from a Software-defined Network (SDN), to perform scaling on the flow data, to generate input data by removing redundant data from among the flow data on which the scaling is performed, on the basis of correlation between the flow data, and to classify network traffic on the basis of the input data.

In a case where the correlation is acquired, the one or more commands may be executed in such a manner as to acquire the correlation using a principal component analysis technique.

The input data may include a flow feature, wherein the one and more commands may be executed in such a manner that the flow feature includes at least one of a flow feature for a point in time at which the flow arrives, a flow feature for a starting position of the flow, and a flow feature for a destination of the flow.

In a case where the network traffic is classified, the one or more commands may be executed in such a manner that the network traffic is classified by the apparatus for classifying traffic performing machine learning.

The apparatus for classifying traffic may perform the machine learning using an ensemble learning technique.

The apparatus for classifying traffic may generate input data on the basis of the flow data on which labeling is performed, extract a learning sample on the basis of the input data, generate learning data on the basis of the extracted learning sample, and perform the machining learning on the basis of the learning data.

The apparatus for classifying traffic may acquire a slope of each of the input data, align the flow feature on the basis of a magnitude of the slope of each of the input data, measure a portion of the input data according to a preset ratio, and measure the learning sample on the basis of the input data on which the sampling is performed.

The apparatus for classifying traffic may perform bundling on the learning sample, and generate the learning data by merging the learning samples on which the bundling is performed.

The apparatus for classifying traffic may generate a learning model for performing the machine learning, classify the learning data into a training set, a validation set, and a test set, acquire a weighting factor of the learning model on the basis of the training set, verify the learning mode through the validation set, and test the verified learning model using the test set.

DETAILED DESCRIPTION

For a more clear understanding of the features and advantages of the present disclosure, exemplary embodiments of the present disclosure will be described in detail with reference to the accompanied drawings. It should be understood, however, that the present disclosure is not limited to particular embodiments disclosed herein but includes all modifications, equivalents, and alternatives falling within the spirit and scope of the present disclosure.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

Figure 1:
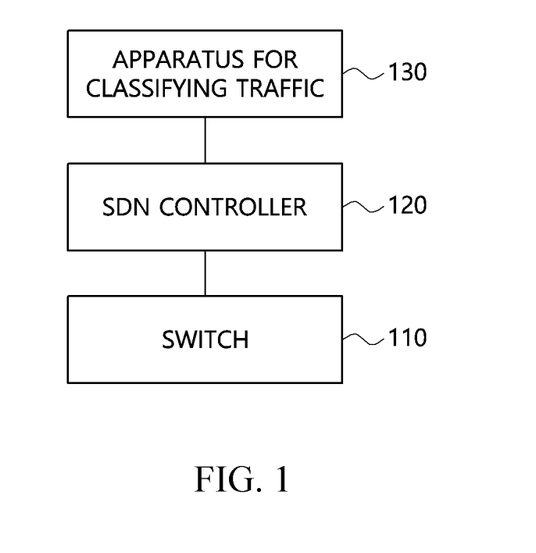
FIG. 1 is a block diagram illustrating a software-defined network (SDN) according to an exemplary embodiment of the present disclosure.

FIG. 1 is a block diagram illustrating a software-defined network (SDN) according to an exemplary embodiment of the present disclosure.

With reference to FIG. 1, the SDN according to the exemplary embodiment of the present disclosure may include a switch 110, a software-defined network controller (SDN) 120, and an apparatus 130 for classifying traffic.

The switch 110 may be a programmable switch. The programmable switch may mean a switch that is capable of being programmed to process a data packet according to a predetermined scheme. Using a high-level language (Domain-specific Language, DSL), the programmable switch may be programmed to process a data packet according to a predetermined scheme. For example, the high-level language may be Programming Protocol-independent Packet Processors (P4). Only one switch 110 is illustrated in the drawings. However, a plurality of switches 110 may be provided.

The switch 110 may receive data packets from a plurality of sources (for example, terminals and computers). The switch 110 may acquire from each of the data packets traffic information that is information necessary for network traffic classification. The traffic information here may include a time stamp indicating the time at which the data packet arrives at the switch, a source Internet Protocol (IP) address of the data packet, a source port of the data packet, a destination IP address of the data packet, a destination port address of the data packet, a protocol used by the data packet, the number of the data packet, the byte number of the data packet, and a size of the data packet. The switch 110 may generate a packet information message including the traffic information. The switch 110 may transmit the packet information message to the SDN controller 120.

The SDN controller 120 may receive the packet information message from the switch 110. The SDN controller 120 may acquire the traffic information of each of the data packets from the packet information message. The SDN controller 120 may classify the traffic information on a per-flow basis and may acquire flow data using a technique of computing an average of the traffic information. The flow here may be a set of data packets having the same source and the same destination.

The SDN controller 120 may classify points in time at which the data packets arrive at the switch 110, according to a preset time unit on the basis of the time stamp, and may acquire the flow. The SDN controller 120 may acquire the flow data using a technique of computing an average of the traffic information of the data packet that is included in the flow.

In addition, the SDN controller 120 may generate a flow message including the flow data. The SDN controller 120 may transmit the flow message to the apparatus 130 for classifying traffic.

The apparatus 130 for classifying traffic may receive the flow message from the SDN controller 120. The apparatus 130 for classifying traffic may be a server and may include a plurality of classifiers. The apparatus 130 for classifying traffic may acquire flow data from the flow message. The apparatus 130 for classifying traffic may perform pre-processing on the flow data and thus may acquire a flow feature. The flow feature may be a value necessary for the network traffic classification.

The apparatus 130 for classifying traffic may perform scaling on the flow data. The apparatus 130 for classifying traffic may perform the scaling using a technique of computing a standard value for the flow data. The apparatus 130 for classifying traffic may compute the standard value for the flow data using Equation 1 that follows.

$$\text{Standard value } (x') = \frac{x - \bar{x}}{\sigma(x)} \quad \text{[Equation 1]}$$

In Equation 1, $\bar{x}$ is an average value of the flow data, and $\sigma(x)$ is a standard deviation of the flow data. The apparatus 130 for classifying traffic may bind redundant flow data into one flow feature on the basis of correlation. The apparatus 130 for classifying traffic may acquire correlation between the flow data using a Principal Component Analysis (PCA) technique. The apparatus 130 for classifying traffic may classify the flow data on the basis of the correlation and may bind the flow data, resulting from the classification, into one flow feature.

For example, the apparatus 130 for classifying traffic may determine that, among the flow data, there is a high correlation between the source IP address and the source port and may bind the source IP address and the source port into a flow feature for a source position of the flow. The apparatus 130 for classifying traffic may determine that, among the flow data, there is a high correlation between the destination IP address and the destination port and may bind the destination IP address and the destination port into a flow feature for a destination of the flow.

That is, the apparatus 130 for classifying traffic may classify the flow data through the correlation and may bind the flow data, resulting from the classification, into a flow feature for the point in time at which the flow arrives (the time stamp), a flow feature for a starting position of the flow (the source IP and the source port), a flow feature for the destination of the flow (the destination IP and the destination port), a flow feature for the protocol used by the flow, a flow feature for the packet count of the data packets, a flow feature for the byte count of the data packets, and a flow feature for the inter-arrival time between arrivals of the successive data packets. The apparatus 130 for classifying traffic may perform instance on the traffic data and the flow feature and thus may generate input data.

The apparatus 130 for classifying traffic may classify traffic of the flow on the basis of the input data. The apparatus 130 for classifying traffic may perform machine learning in advance. The apparatus 130 for classifying traffic may classify the traffic of the flow on the basis of a result of performing the machine learning. The apparatus 130 for classifying traffic may include a plurality of classifiers for classifying the traffic of the flow. For example, n (n is an integer that is greater than 1) classifiers may be provided.

The apparatus 130 for classifying traffic may use Python 2 or Python 3 as a machine learning programming language. The apparatus 130 for classifying traffic may perform the machine learning using a framework, such as TensorFlow. The apparatus 130 for classifying traffic may perform the machine learning on the basis of an ensemble learning technique. The apparatus 130 for classifying traffic may use Light Gradient Boosting Machine (LightGBM) as an algorithm for the ensemble learning technique. LightGBM may be a LightGBM algorithm based on boosting. The apparatus 130 for classifying traffic may perform the machine learning using the following method.

Figure 2:
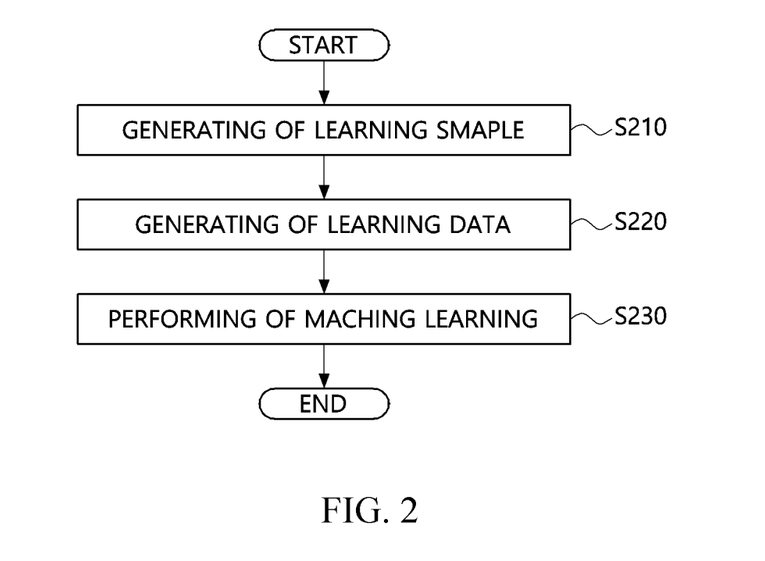
FIG. 2 is a flowchart illustrating a machine learning method according to an exemplary embodiment of the present disclosure.

FIG. 2 is a flowchart illustrating a machine learning method according to an exemplary embodiment of the present disclosure.

With reference to FIG. 2, an apparatus for classifying traffic (for example, the apparatus 130 for classifying traffic in FIG. 1) may generate a learning sample for performing the machine learning on the basis of the input data (S210). The apparatus for classifying traffic may receive the flow message including the flow data from an SDN controller (for example, the SDN controller 120 in FIG. 1). The flow data may be flow data on which labeling of the traffic information is performed by the SDN controller. The apparatus for classifying traffic may perform the pre-processing and the instance on the traffic information and thus may generate the input data.

The apparatus for classifying traffic may generate the learning sample for performing the machine learning using a Gradient-based One-Side Sampling (GOSS) technique. The GOSS technique may be a technique of generating the learning sample on the basis of a slope of the input data. The slope here of the input data may be a slope of a loss function with respect to the input data. The loss function may be a function relating to a difference between an expected output value for the input data and an actual output value. A method in which the apparatus for classifying traffic generates the learning sample using the GOSS technique may be as follows.

Figure 3:
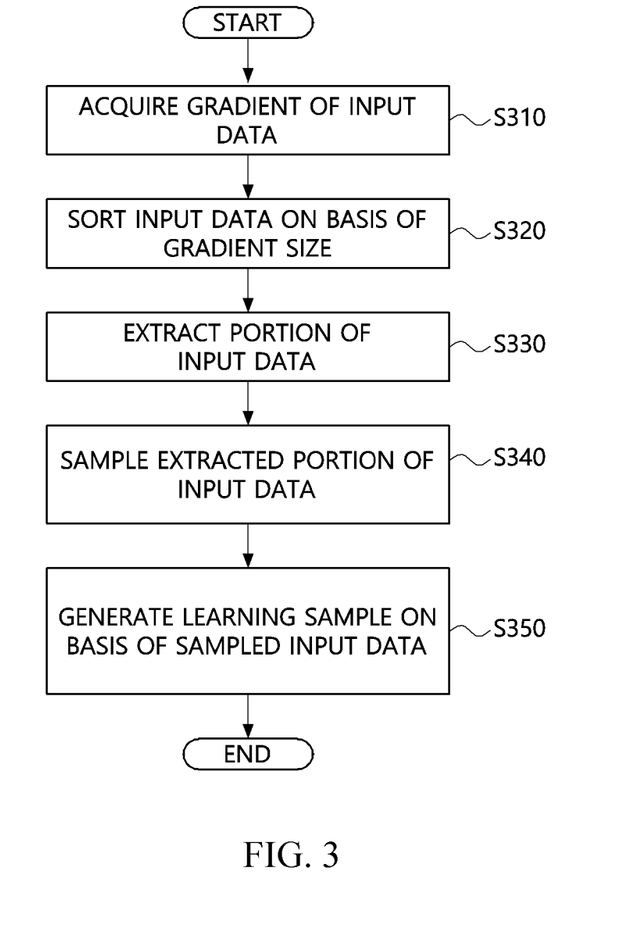
FIG. 3 is a flowchart illustrating a method of generating a learning sample according to an exemplary embodiment of the present disclosure.

FIG. 3 is a flowchart illustrating a method of generating a learning sample according to an exemplary embodiment of the present disclosure.

With reference to FIG. 3, the apparatus for classifying traffic may acquire a slope or a gradient of each of the input data (S310). The apparatus for classifying traffic may express each of the input data as a concave function or a convex function. The apparatus for classifying traffic may acquire a slope by differentiating each of the functions. The apparatus for classifying traffic may align or sort the input data on the basis of a magnitude of the slope or a gradient size (S320). For example, the apparatus for classifying traffic may align the input data in order of decreasing the magnitude of the slope.

The apparatus for classifying traffic may extract a portion of the input data from the input data (S330). The apparatus for classifying traffic may extract the top a % of the input data arranged in order of decreasing the magnitude of the slope and may extract the bottom b % of the input data arranged in order of decreasing the slope magnitude. The apparatus for classifying traffic may perform sampling on the extracted portion of the input data (S340). The apparatus for classifying traffic may perform the sampling on the bottom b % of the input data arranged in order of decreasing the magnitude of the slope. The apparatus for classifying traffic may amplify the bottom b % of the input data arranged in order of decreasing the magnitude of the slope, in such a manner as to correspond to a weighting factor of the bottom b % of the input data. The apparatus for classifying traffic may compute a weight factor c using Equation 2 that follows.

$$c = \frac{1-a}{b} \quad \text{[Equation 2]}$$

The apparatus for classifying traffic may not perform the sampling on the top a % of the input data arranged in order of decreasing the magnitude of the slope. The apparatus for classifying traffic may generate the learning sample on the basis of the input data on which the sampling is performed (S350). The apparatus for classifying traffic may compute an information gain on the basis of the top a % of the input data arranged in order of decreasing the slope magnitude and the bottom b % of the input data arranged in order of decreasing the magnitude of the slope. The information gain here may be measured through variance. The bottom b % for the input data arranged in order of decreasing the magnitude of the slope may be input data that results from the amplification performed in such a manner as to correspond to weighting factor c. For example, variance acquisition for the input data j at node d may be computed using Equation 3 that follows.

$$\tilde{V}_j(d) = \frac{1}{n}\left(\frac{\left(\sum_{i \in A_l} g_i + \frac{1-a}{b}\sum_{i \in B_l} g_i\right)^2}{n_l(d)} + \frac{\left(\sum_{i \in A_r} g_i + \frac{1-a}{b}\sum_{i \in B_r} g_i\right)^2}{n_r(d)}\right) \quad \text{[Equation 3]}$$

Where $\tilde{V}_j(d)$ may be the information gain acquired on the basis of the top a % of the input data arranged in order of decreasing the magnitude of the slope and the bottom b % of the input data arranged in order of decreasing the magnitude of the slope, $n_l(d)$ may be the top a % of the input data arranged in order of decreasing the magnitude of the slope, $n_r(d)$ the bottom b % of the input data arranged in order of decreasing the magnitude of the slope, N may be the total sum of the number of input data corresponding to the top a % of the input data arranged in order of decreasing the magnitude of the slope and the number of input data corresponding to the bottom b % of the input data arranged in order of decreasing the slope magnitude, I may be a slope of each of the flow features, and $g_i$ may mean a slope of the loss function with respect to each of the input data. In addition, In Equation 3, A may be a set of the top a % input data arranged in order of decreasing the magnitude of the slope, and B may be a set of the bottom b % input data arranged in order of decreasing the slope magnitude. An approximation ratio in the GOSS technique may be expressed as in Equation 4 that follows.

$$O\left(\frac{1}{n_l(d)} + \frac{1}{n_r(d)} + \frac{1}{\sqrt{n}}\right) \quad \text{[Equation 4]}$$

However, a method of computing the information gain on the basis of the flow feature may be expressed in Equation 5 that follows.

$$V_j(d) = \frac{1}{n}\left(\frac{\left(\sum_{\{i \leq d\}} g_i\right)^2}{n_l(d)} + \frac{\left(\sum_{\{i > d\}} g_i\right)^2}{n_r(d)}\right) \quad \text{[Equation 5]}$$

Where $V_j(d)$ may be the information gain acquired on the basis of all the flow features of the input data. That is, the more increased the number of the input data used to compute the information gain, the more identical the information gain acquired using Equation 3 may be to the information gain acquired using Equation 5.

With reference back to FIG. 2, the apparatus for classifying traffic may generate learning data by bundling and merging the extracted learning sample (S220). The apparatus for classifying traffic may perform the bundling and the merging on the learning sample using an Exclusive Feature Bundling (EFB) technique. The EFB technique may be a technique of bundling and merging the learning sample on the basis of the flow feature of the learning sample. A method in which the apparatus for classifying traffic generates the learning data by bundling and merging the learning sample using the EFB technique may be as follows.

Figure 4:
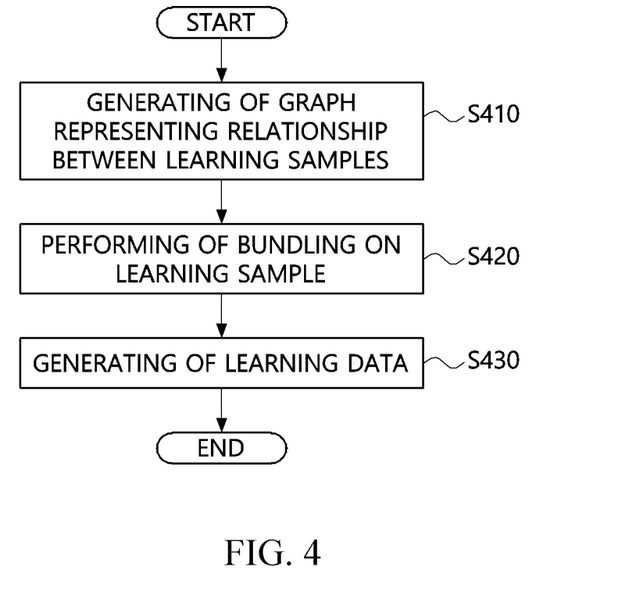
FIG. 4 is a flowchart illustrating a method of generating learning data according to an exemplary embodiment of the present disclosure.

FIG. 4 is a flowchart illustrating a method of generating learning data according to an exemplary embodiment of the present disclosure.

With reference to FIG. 4, the apparatus for classifying traffic may generate a graph representing a relationship between the learning samples (S410). The apparatus for classifying traffic may check whether or not flow features are mutually exclusive, with the flow feature being defined as representing a node. In a case where flow features do not have a non-zero value at the same time, the apparatus for classifying traffic may determine that the flow features are mutually exclusive. The apparatus for classifying traffic may acquire a graph representing a relationship between samples by making an edge connection between the nodes that are not mutually exclusive.

The apparatus for classifying traffic may perform the bundling on the learning sample on the basis of the graph (S420). The apparatus for classifying traffic may align the samples in descending order according to the degree of the node. The apparatus for classifying traffic may align the samples in descending order on the basis of the acquired graph. The apparatus for classifying traffic may allocate the flow features aligned in descending order to a bundle. In a case where a bundle including a flow feature and samples that are not mutually exclusive is present, the apparatus for classifying traffic may allocate the flow feature to a pre-existing bundle. In a case where only a bundle including a flow feature and sampled that are mutually exclusive is present, the apparatus for classifying traffic may generate a new bundle. The apparatus for classifying traffic may allocate the samples to a new bundle.

The apparatus for classifying traffic may generate the learning data by merging bundles (S430). The apparatus for classifying traffic may identify values of the samples included in each of the bundles. The apparatus for classifying traffic may add offset to the values of the samples. For example, it is assumed that sample A has a value of [0, 10] and that sample B has a value of [0, 20]. Offset is added to the value of sample B, and thus, sample B may be set to take on a value from [10, 30]. Then, samples A and B may be merged and may be set to take on a value from [0, 30]. Thus, sample B may be replaced with sample A. That is, the learning data may be generated using a technique of merging sample B with sample A.

With reference back to FIG. 2, the apparatus for classifying traffic may perform the machine learning on the basis of the learning data (S230).

The apparatus for classifying traffic may generate a learning model on the basis of the learning data. The apparatus for classifying traffic may perform the machine learning through a k-fold cross validation technique. The apparatus for classifying traffic may perform shuffle on the learning data. The apparatus for classifying traffic may classify the learning data on which the shuffle is performed into a test set, a validation set, and a training set. The apparatus for classifying traffic may classify a portion of the learning data as the test set. The apparatus for classifying traffic may classify the remaining portions of the learning data as k data sets. The remaining portions of the learning data may be portions other than the portion classified as the test set. For example, k may be 5, and the apparatus for classifying traffic may classify the remaining portions of the learning data as first to fifth data sets, respectively.

Among the k data sets, the apparatus for classifying traffic may classify one data set as the validation set and may classify the remaining data sets as the training sets. For example, the apparatus for classifying traffic may classify a first data set as the validation set and may classify second to fifth data sets as the training sets, respectively. The apparatus for classifying traffic may classify the second data set as the validation set and may classify the first data set and the third to fifth data sets as the training sets, respectively. The apparatus for classifying traffic may classify the third data set as the validation set and may classify the first and second data sets and the fourth and fifth data sets as the training sets, respectively. In addition, the apparatus for classifying traffic may classify the fourth data set as the validation set and may classify the first to third data sets and the fifth data set as the training sets, respectively. The apparatus for classifying traffic may classify the fifth data set as the validation set and may classify the first to fourth data sets as the training sets, respectively.

The apparatus for classifying traffic may input the training set and may acquire an output value. The apparatus for classifying traffic may perform the machine learning using a technique of verifying the output value on the basis of the validation set. The apparatus for classifying traffic may acquire a weighting factor of the learning mode on the basis of the output value acquired by inputting the training set. The apparatus for classifying traffic may input the validation set into the learning mode and may verify a result of the learning by comparing an output of the validation set and a labeling value. That is, the apparatus for classifying traffic may verify through the validation set the weighting factor of the learning model acquired through the training set.

For example, the apparatus for classifying traffic may input the second to fifth data sets, may acquire output values, and may verify the output values on the basis of the first data set. The apparatus for classifying traffic may input the first data set and the third to fifth data sets, may acquire output values, and may verify the output values on the basis of the second data set. The apparatus for classifying traffic may input the first and second data sets and the fourth and fifth data sets, may acquire output values, and may verify the output values on the basis of the third data set. In addition, the apparatus for classifying traffic may input the first to third data sets and the fifth data set, may acquire output values, and may verify the output values on the basis of the fourth data set. The apparatus for classifying traffic may input the first to fourth data sets, may acquire output values, and may verify the output values on the basis of the fifth data set. The apparatus for classifying traffic may reiterate this process n (n may be 10) times. Subsequently, the apparatus for classifying traffic may determine a result of performing the machine training using the test set. The apparatus for classifying traffic may input the test set and may acquire an output value. The apparatus for classifying traffic may evaluate a result of performing learning, by comparing the output value with the labeling value of data that is included in the test set.

This process may be performed by each of the classifiers. In a case where the output value of the test set that results of the classification by a first classifier is different from the labeling value, the apparatus for classifying traffic may extract a training set in which an output error occurs, from among the training sets. The apparatus for classifying traffic may input the extracted training set into a second classifier and may adjust a weighting factor of the training set by reiteratively performing the above-described learning process. The apparatus for classifying traffic may reiteratively perform this learning process until an error does not occur in the output value of the training set.

Figure 5:
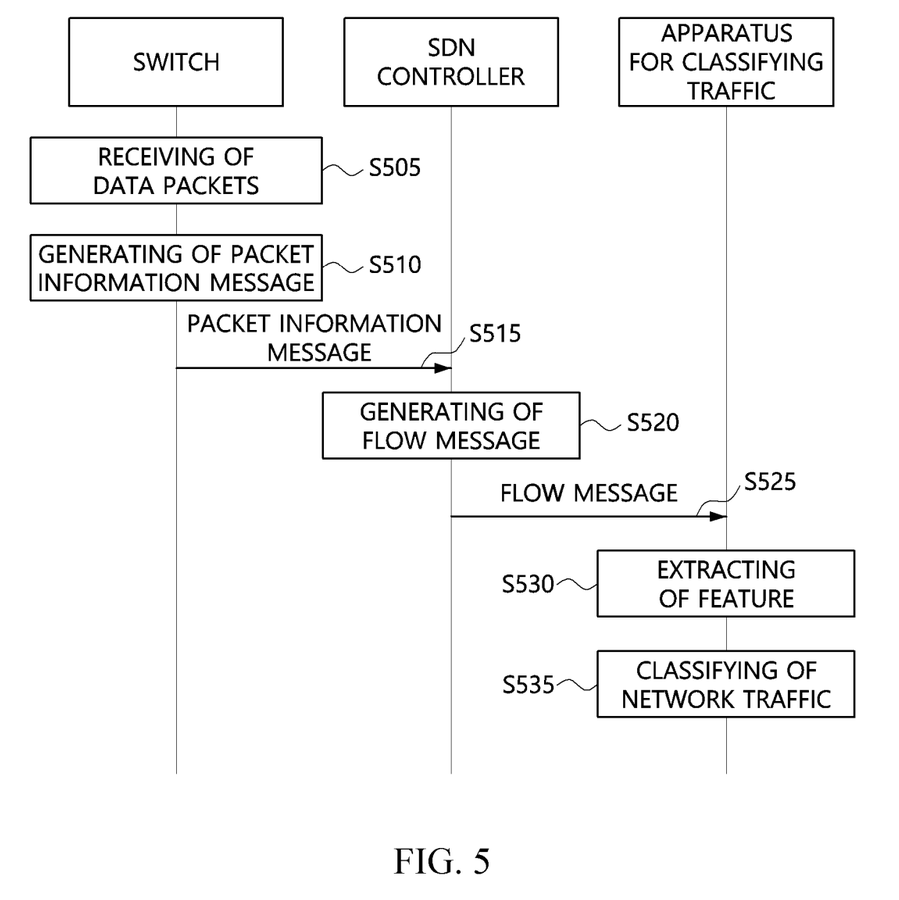
FIG. 5 is a flowchart illustrating a method for classifying traffic according to an exemplary embodiment of the present disclosure.

FIG. 5 is a flowchart illustrating a method for classifying traffic according to an exemplary embodiment of the present disclosure.

With reference to FIG. 5, a switch, an SDN controller, and an apparatus for classifying traffic may be the same as or similar to the switch 110, the SDN controller 120, and the apparatus 130 for classifying traffic, respectively, in FIG. 1, in terms of configuration.

The switch may receive data packets from a plurality of sources (S505). The switch may generate packet information message on the basis of the data packets (S510). The switch may acquire traffic information from each of the data packets. The traffic information may be information necessary for network traffic classification. The switch may generate the packet information message including the traffic information. The switch may transmit the packet information message to the SDN controller (S515).

The SDN controller may receive the packet information message from the switch (S515). The SDN controller may acquire the traffic information of each of the data packets on the basis of the packet information message. The SDN controller may generate a flow message on the basis of the traffic information (S520). The SDN controller may classify the traffic information on a per-flow basis. That is, the SDN controller may classify the traffic information on a per-flow basis on the basis of a time stamp in the traffic information. The SDN controller may acquire flow data using a technique of computing an average of the traffic information on a per-flow basis. The SDN controller may generate the flow message including the flow data. The SDN controller may transmit the flow message to the apparatus for classifying traffic (S525).

The apparatus for classifying traffic may receive the flow message from the SDN controller (S525). The apparatus for classifying traffic may acquire the flow data from the flow message. The apparatus for classifying traffic may extract a flow feature (S530). The apparatus for classifying traffic may extract the flow feature on the basis of the flow data. The apparatus for classifying traffic may acquire the flow feature by performing pre-processing on each of the flow data. The apparatus for classifying traffic may extract the flow feature by performing the scaling on each of the flow data and performing the pre-processing on each of the flow data using a technique of classifying on the basis of correlation the flow data on which the scaling is performed.

The apparatus for classifying traffic may classify network traffic on the basis of the extracted flow feature (S535). The apparatus for classifying traffic may classify the network traffic on the basis of a result of the machine learning performed in advance. That is, the apparatus for classifying traffic may classify the network traffic by acquiring the output value for each of the flow features.

The switch 110, the SDN controller 120, and the apparatus 130 for classifying traffic in FIG. 1 may be communication nodes. The communication nodes may be configured as follows.

Figure 6:
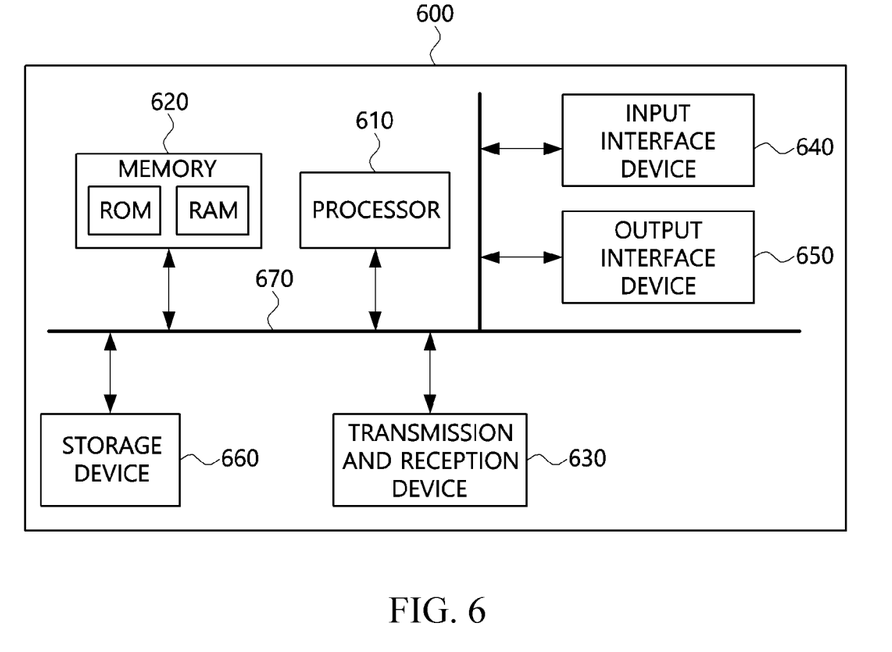
FIG. 6 is a conceptual diagram illustrating an exemplary embodiment of a communication node constituting a software defined network according to an exemplary embodiment of the present disclosure.

FIG. 6 is a conceptual diagram illustrating an exemplary embodiment of a communication node constituting a software defined network according to an exemplary embodiment of the present disclosure.

Referring to FIG. 6, a communication node 600 may comprise at least one processor 610, a memory 620, and a transceiver 630 connected to a network for performing communications. Also, the communication node 600 may further comprise an input interface device 640, an output interface device 650, a storage device 660, and the like. Each component included in the communication node 600 may communicate with each other as connected through a bus 670. However, each of the components included in the communication node 600 may be connected to the processor 610 via a separate interface or a separate bus rather than the common bus 670. For example, the processor 610 may be connected to at least one of the memory 620, the transceiver 630, the input interface device 640, the output interface device 650, and the storage device 660 via a dedicated interface.

The processor 610 may execute at least one instruction stored in at least one of the memory 620 and the storage device 660. The processor 610 may refer to a central processing unit (CPU), a graphics processing unit (GPU), or a dedicated processor on which methods in accordance with embodiments of the present disclosure are performed. Each of the memory 620 and the storage device 660 may include at least one of a volatile storage medium and a non-volatile storage medium. For example, the memory 620 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

According to the present disclosure, traffic classification can be automated by classifying network traffic through machine learning.

In addition, according to the present disclosure, the precision of traffic classification can be improved by classifying the network traffic through the machine learning.

What is claimed is:

1. A method of classifying traffic, the method comprising:
receiving flow data including information on flow;
performing scaling on the flow data;
generating input data by removing redundant data from among the flow data on which the scaling is performed, on the basis of correlation between the flow data; and
classifying, by an apparatus for classifying traffic performing machine learning in advance, network traffic on the basis of the input data,
wherein the machine learning is performed by:
generating the input data on the basis of the flow data on which labeling is performed; and
extracting a learning sample on the basis of the input data,
wherein the extracting of the learning sample comprises:
acquiring a slope of each of the input data;
aligning the input data on a magnitude of the slope of each of the input data;
extracting a portion of the input data from the input data according to a preset ratio; and
extracting the learning sample on the basis of the input data on which sampling is performed.

2. The method of claim 1, wherein the correlation is acquired using a principal component analysis technique.

3. The method of claim 1, wherein the input data includes a flow feature, the flow feature including at least one of information on a point in time at which the flow arrives, information on a starting position of the flow, and information on a destination of the flow.

4. The method of claim 1, wherein the machine learning is performed using an ensemble learning technique.

5. The method of claim 1, wherein the machine learning is performed by:
generating learning data on the basis of the extracted learning sample; and
performing the machine learning on the basis of the learning data.

6. The method of claim 5, wherein the generating of the learning data comprises:
  performing bundling on the learning sample; and
  generating the learning data by merging the learning sample on which the bundling is performed.

7. The method of claim 5, wherein the performing of the machine learning comprises:
  generating a learning model for performing the machine learning;
  classifying the learning data into a training set, a validation set, and a test set;
  acquiring a weighting factor of the learning model on the basis of the training set;
  verifying the learning model on the validation set; and
  testing the verified learning model using the test set.

8. An apparatus for classifying traffic, the apparatus comprising:
  a processor; and
  a memory in which one or more commands to be executed by the processor are stored,
  wherein the one or more commands are executed in such a manner as to receive flow data including information on flow from a Software-defined Network (SDN), to perform scaling on the flow data, to generate input data by removing redundant data from among the flow data on which the scaling is performed, on the basis of correlation between the flow data, and to classify network traffic on the basis of the input data by the apparatus for classifying traffic performing machine learning,
  wherein the apparatus for classifying traffic generates the input data on the basis of the flow data on which labeling is performed and extracts a learning sample on the basis of the input data, and
  wherein the apparatus for classifying traffic acquires a slope of each of the input data, aligns a flow feature on the basis of a magnitude of the slope of each of the input data, measures a portion of the input data according to a preset ratio, and measures the learning sample on the basis of the input data on which sampling is performed.

9. The apparatus of claim 8, wherein in a case where the correlation is acquired, the one or more commands are executed in such a manner as to acquire the correlation using a principal component analysis technique.

10. The apparatus of claim 8, wherein the input data comprises the flow feature,
  wherein the one and more commands are executed in such a manner that the flow feature includes at least one of a flow feature for a point in time at which the flow arrives, a flow feature for a starting position of the flow, and a flow feature for a destination of the flow.

11. The apparatus of claim 8, wherein the apparatus for classifying traffic performs the machine learning using an ensemble learning technique.

12. The apparatus of claim 8, wherein the apparatus for classifying traffic generates learning data on the basis of the extracted learning sample, and performs the machining learning on the basis of the learning data.

13. The apparatus of claim 12, wherein the apparatus for classifying traffic performs bundling on the learning sample, and generates the learning data by merging the learning sample on which the bundling is performed.

14. The apparatus of claim 12, wherein the apparatus for classifying traffic generates a learning model for performing the machine learning, classifying the learning data into a training set, a validation set, and a test set, acquiring a weighting factor of the learning model on the basis of the training set, verifying the learning model by the validation set, and testing the verified learning model using the test set.

* * * * *